United States Patent
Moll et al.

(10) Patent No.: US 8,930,638 B2
(45) Date of Patent: Jan. 6, 2015

(54) METHOD AND APPARATUS FOR SUPPORTING TARGET-SIDE SECURITY IN A CACHE COHERENT SYSTEM

(71) Applicant: QUALCOMM Technologies, Inc., San Diego, CA (US)

(72) Inventors: Laurent Moll, San Jose, CA (US); Jean-Jacques Lecler, Sunnyvale, CA (US); Philippe Boucard, Le Chesnay (FR)

(73) Assignee: QUALCOMM Technologies, Inc., San Diego, CA (US)

(*) Notice: Subject to any disclaimer, the term of this patent is extended or adjusted under 35 U.S.C. 154(b) by 182 days.

(21) Appl. No.: 13/686,604

(22) Filed: Nov. 27, 2012

(65) Prior Publication Data

US 2014/0149687 A1    May 29, 2014

(51) Int. Cl.
*G06F 12/00* (2006.01)
*G06F 12/08* (2006.01)
*G06F 12/14* (2006.01)
*G06F 12/06* (2006.01)
*G06F 13/16* (2006.01)

(52) U.S. Cl.
CPC ........ *G06F 12/0828* (2013.01); *G06F 12/0831* (2013.01); *G06F 12/14* (2013.01); *G06F 12/0815* (2013.01); *G06F 12/1491* (2013.01); *G06F 12/0891* (2013.01); *G06F 12/0676* (2013.01); *G06F 13/1642* (2013.01)
USPC ............... 711/146; 711/141; 710/18; 710/55; 710/310; 712/225; 712/244; 713/154; 713/166; 713/193; 714/21; 714/42; 714/718; 714/763; 714/819

(58) Field of Classification Search
CPC ............ G06F 12/0676; G06F 12/0815; G06F 12/0891; G06F 12/1491; G06F 13/1642
USPC ...... 711/141, 146; 710/18, 55, 310; 712/225, 244; 713/154, 166, 193; 714/21, 42, 718, 763, 819
See application file for complete search history.

(56) References Cited

U.S. PATENT DOCUMENTS

| | | |
|---|---|---|
| 5,680,577 A | 10/1997 | Aden et al. |
| 2003/0009621 A1 | 1/2003 | Gruner et al. |
| 2003/0204679 A1 | 10/2003 | Blankenship |
| 2005/0028057 A1* | 2/2005 | Briggs et al. .......... 714/718 |
| 2005/0289439 A1* | 12/2005 | Nerl et al. .......... 714/763 |
| 2006/0224838 A1 | 10/2006 | Blumrich et al. |
| 2009/0089540 A1* | 4/2009 | Hansen et al. ......... 712/29 |
| 2010/0185821 A1* | 7/2010 | Paver et al. .......... 711/146 |

OTHER PUBLICATIONS

International Search Report and Written Opinion—PCT/US2013/072063—ISA/EPO—Apr. 9, 2014.

* cited by examiner

*Primary Examiner* — Reba I Elmore
(74) *Attorney, Agent, or Firm* — Muncy, Geissler, Olds & Lowe, P.C.

(57) ABSTRACT

A cache coherency controller, a system comprising such, and a method of its operation are disclosed. The coherency controller ensures that target-side security checking rules are not violated by the performance-improving processes commonly used in coherency controllers such as dropping, merging, invalidating, forwarding, and snooping. This is done by ensuring that requests marked for target-side security checking and any other requests to overlapping addresses are forwarded directly to the target-side security filter without modification or side effects.

29 Claims, 6 Drawing Sheets

METHOD AND APPARATUS FOR SUPPORTING TARGET-SIDE SECURITY IN A CACHE COHERENT SYSTEM

FIELD OF THE INVENTION

This invention is related to computers and, more specifically to cache-coherent system-on-chip design and data security in such systems.

BACKGROUND

Cache coherency is used to maintain the consistency of data in a distributed shared memory system. A number of agents, each usually comprising one or more caches, are connected together through a fabric or a central cache coherency controller. This allows the agents to take advantage of the performance benefit of caches while still providing a consistent view of data across agents.

Cache coherency protocols are usually based on acquiring and relinquishing permissions on sets of data, typically called cache lines, containing a fixed amount of data (e.g. 32 or 64 bytes). Typical permissions are:

(1) None—The cache line is not in the agent and the agent has no permission to read or write the data.
(2) Readable—The cache line is in the agent and the agent has permission to read the cache line content stored locally. Multiple agents can simultaneously have read permission on a cache line (i.e. multiple readers).
(3) Readable and writable—The cache line is in the agent and the agent has permission to write (and typically read) the cache line content. Only one agent can have write permission on a cache line, and no other agent can have read permission at the same time.

There is usually a backing store for all cache lines (e.g. a DRAM). The backing store is the location where the data is stored when it is not in any of the caches. At any point in time, the data in the backing store may not be up to date with respect of the latest copy of a cache line in an agent. Because of this, cache lines inside agents often includes an indication of whether the cache line is clean (i.e. it has the same value as in the backing store) or dirty (i.e. it is more up-to-date than in the backing store and needs to be written back to the backing store at some point).

The permission and "dirtiness" of a cache line in an agent is referred to as the "state" of the cache line. The most common set of coherency states is called MESI (Modified-Exclusive-Shared-Invalid), where Shared corresponds to the read permission (and the cache line being clean) and both Modified and Exclusive give read/write permissions, but in the Exclusive state, the line is clean, while in the Modified state, the line is dirty and must be eventually written back. In that state set, shared cache lines are always clean.

There are more complex versions like MOESI (Modified-Owned-Exclusive-Shared-Invalid) where cache lines with read permission are allowed to be dirty.

Other protocols may have separate read and write permissions. Many cache coherency state sets and protocols exist.

In general, when an agent needs a permission on a cache line that it does not have, it must interact with other agents directly or through a cache coherency controller to acquire the permission. In the simplest "snoop-based" protocols, the other agents must be "snooped" to make sure that the permission requested by the agent is consistent with the permissions already owned by the other agents. For instance, if an agent requests read permission and no other agent has write permission, the read permission can be granted. However, if an agent already has write permission, that permission must be revoked from that agent first before it is granted to the original requester.

In some systems, the agent directly places snoop requests on a bus and all agents (or at least all other agents) respond to the snoop requests. In other systems, the agent places a permission request to a coherency controller, which in turn will snoop the other agents (possibly also the requesting agent itself).

In directory-based protocols, directories of permissions acquired by agents are maintained and snoops are sent only when permissions need to change in an agent.

Snoop filters may also be used to reduce the number of snoops sent to agents. Snoop filters keep a coarse view of the content of the agents and don't send a snoop to an agent if it knows that agent does not need to change its permissions.

Data and permissions interact in cache coherency protocols, but the way they interact varies. Agents usually place requests for both permission and data simultaneously, but not always. For instance, an agent that wants to place data in its cache for reading purposes and has neither the data nor the permission can place a read request including both the request for permission and for the data itself. However, an agent that already has the data and read permission but needs write permission may place an "upgrade" request to obtain write permission, but does not need data.

Likewise, responses to snoop requests can include an acknowledgement that the permission change has happened, but can also optionally contain data. The snooped agent may be sending the data as a courtesy. Alternatively, the snooped agent may be sending dirty data that has to be kept to be eventually written back to the backing store.

Agents can hold permission without data. For instance, an agent that wants to write a full cache line may request write permission without data, as the agent knows it will not use the data (the agent will override it completely). In some systems, holding partial data is permitted (e.g. in sectors or per byte). This is useful to limit data transfers but it makes the cache coherency protocol more complex.

Many cache coherency protocols provide two related ways for data to leave an agent. One is through the snoop response path, providing data as a response to a snoop. The other is a spontaneous write path (often called write back or evict path) where the agent can send the data out when it does not want to keep it anymore. In some protocols, the snoop response and write back paths are shared.

Fully coherent agents are capable of both owning permissions for cache lines and receiving snoop requests (to check and possibly change their permissions), triggered by a request from another agent. A common type of fully coherent agent is a microprocessor with a coherent cache. As the microprocessor needs to do reads and writes, it acquires the appropriate permissions and potentially data and puts them in its cache. Many modern microprocessors have multiple levels of caches inside. Many modern microprocessors contain multiple microprocessor cores, each with its own cache and often a shared second-level cache. Many other types of agents may be fully coherent such as DSPs, GPUs and various types of multimedia agents comprising caches.

In contrast, I/O coherent (also called one-way coherent) agents do not use a coherent cache, but they need to operate on a consistent copy of the data with respect to the fully coherent agents. As a consequence, their read and write requests may trigger coherency actions (snoops) to fully coherent agents. In most cases, this is done by having either a special bridge or the central coherency controller issue the appropriate coherency actions and sequence the actual reads or writes to the backing store if necessary. In the case of a small bridge, that bridge may act as a fully coherent agent holding permissions for a small amount of time. In the case of the central coherency controller, the controller tracks the reads and writes, and prevents other agents from accessing cache lines that are being processed on behalf of the I/O coherent agent.

Security

Security in a system relates to the definition and enforcement of access control rules.

In some simple security models, all of the requests from an initiator or individual requests separately may be marked as secure or non-secure. Only secure requests may access secure devices or secure address ranges of devices. One such model is ARM's TrustZone where all requests carry a NS (non-secure) bit, and this bit is provided by initiators and checked by targets. Requests with mismatching security indications may be disallowed and responded to with an error indication.

Other models use several security levels or parallel silos to protect multiple types of secure data. Examples of secure data types include decrypted protected multimedia content (audio, video) and banking/payment information.

In some models, security checks can be done at or near the initiator of a request if that initiator or the logic connected to it has enough information about the destination of the request to apply security rules. However, this is not always practical. In some cases, the target of a request must use complex rules to determine the permission of that request. The rules can use a number of parameters including the identity of the source of the request, the address of the request and an indication of the security level or space of the request. When these rules are complex (for instance when the address checking involves many ranges), it is more practical to do the rule checking in the target or just before the target or a group of targets, so as to not duplicate the complex state and logic.

The security checking performed on the side of a coherency controller that is closer to the target (generally a backing store) of transactions is referred to as "target-side security checking". Such security checking need not be performed in the immediate vicinity of any particular target. Target-side security checking works well in a non-coherent system where requests are carried basically unchanged from initiator to target. However, in coherent systems, coherent requests (fully coherent or I/O coherent) interact with the fully coherent agents in the system and may get discarded, merged, or responded to before reaching the target. This makes target-side security checking impossible for several reasons including:

- requests (secure or otherwise) may never reach the target if they are discarded or forwarded before being sent to the target;
- requests may never reach the target if they hit (are found to be present) in a cache and the data can be provided by a coherent agent directly; and
- requests may be merged with requests or snoop responses from coherent agents, making the identification of the requester impossible.

Some security models like ARM's TrustZone deal with this by keeping the secure and non-secure worlds separate, including in the coherency scheme. To do this, the secure indication must be carried throughout the coherent agents. In particular, the secure indication bit must be added to all cache lines in the caches. It acts like an extra address bit. This has a few issues. First, it is intrusive as it requires the coherency scheme and the caches to carry and deal with this extra bit. Second, it is not flexible or extensible as only this single bit can be used, so it is not easy to build a system with more than 2 levels of security or a system wherein the initiators are not trusted to (or do not) generate the secure indication bit.

Figure 1:
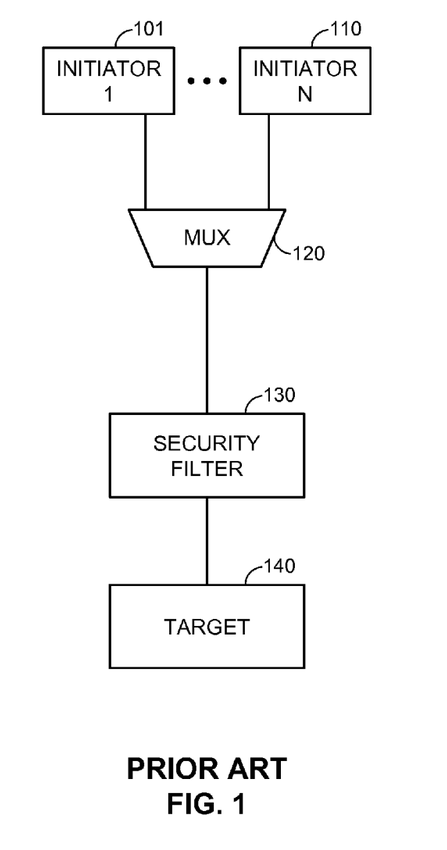
FIG. 1 illustrates a conventional system of multiple initiators with target-side security filtering.

FIG. 1 shows a conventional system without coherency comprising one or more non-coherent initiators 101 to 110, connected through a multiplexer 120 and a target-side security filter 130 to a target 140. In this system, the security filter 130 gets requests from the non-coherent initiators 101 to 110, generally untouched. It may use any number of properties of the requests (including the identity of the requester) to make security decisions.

Figure 2:
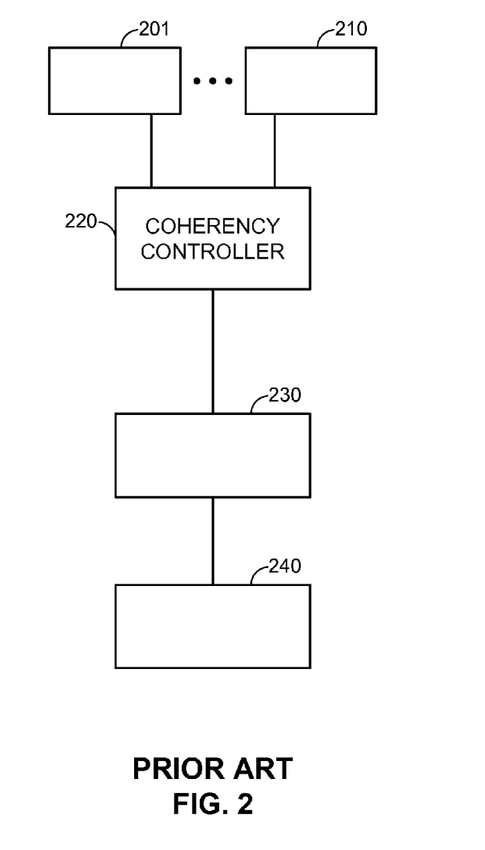
FIG. 2 illustrates a conventional system with cache coherent initiators.

FIG. 2 shows a conventional coherent system comprising one or more coherent initiators 201 to 210, a coherency controller 220, a target-side security filter 230 and a target 240. In this system, the security filter 230 only has partial visibility on the requests placed by the coherent initiators 201 to 210 as the original requests may have been dropped, merged or responded to locally by the coherency controller 220.

FIG. 3 to FIG. 7 show a number of typical cases in a system with coherent initiators where the original transaction from a coherent initiator may not reach the target-side security filter, or may reach it in a different form. These cases are: discarding, merging, invalidation, forwarding, and snooping. These noteworthy examples do not constitute an exhaustive list.

Figure 3:
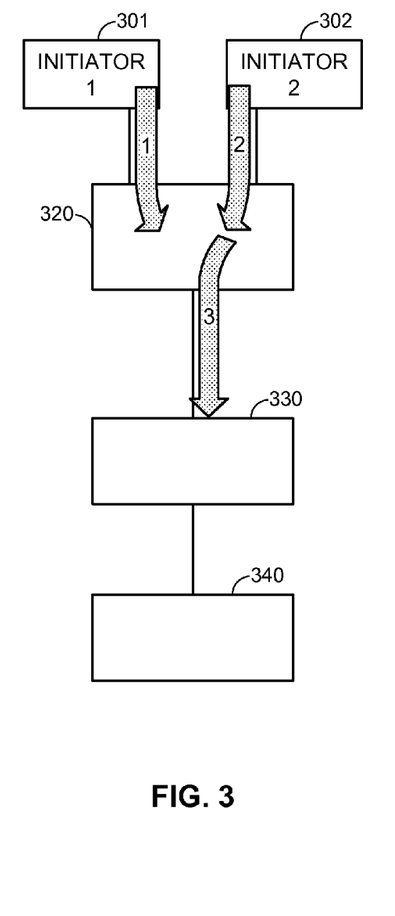
FIG. 3 illustrates two requests, one being blocked.

FIG. 3 shows a sequence where initiator 301 sends a write addressed to target 340 through coherency controller 320 and target-side security filter 330. Second, initiator 302 subsequently sends a write to the same set or an overlapping set of addresses. Third, if the coherency controller 320 still has the first write and hasn't sent it to the target 340, the coherency controller 320 may discard the first write or part of the first write and only send the second write to the target 340. As a consequence, if the security check fails on the second write then the security filter 330 may not see the first write or part of the first write, making it impossible to handle a potential security violation and potentially losing valid data.

Figure 4:
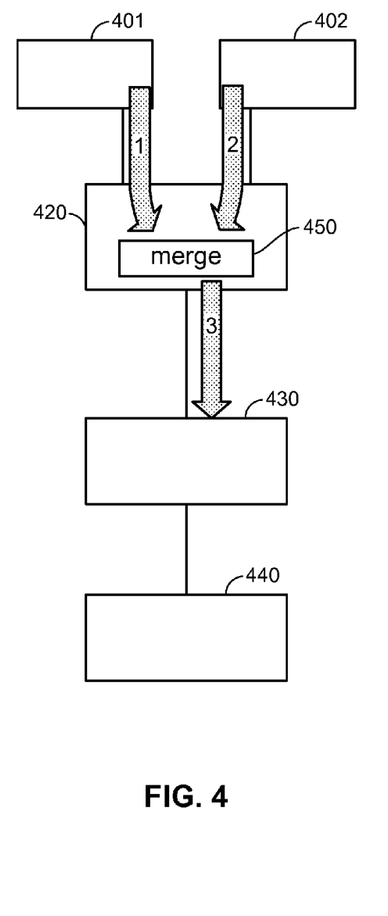
FIG. 4 illustrates merging the data of two requests.

FIG. 4 shows a sequence where initiator 401 sends a write addressed to target 440 through coherency controller 420 and target-side security filter 430. Second, initiator 402 sends a write to some of the same addresses, in any order with respect to the first write. The coherency controller 420 merges 450 the two writes. Third the coherency controller 420 sends the merged third write to the target-side security filter 430. As a consequence, the target-side security filter 430 will see a merged write. Because the merged write contains data from both first and second write, it cannot be tagged with the identity of the original requester needed for target-side security checking, so the target-side security filter 430 cannot perform requester-based filtering. Other attributes of the first and second writes may also become unusable as the coherency controller 420 may not be able to reconcile those attributes into the third write. As a result, the target-side security filter 430 may not be able to apply the security rules to the third, merged write.

Figure 5:
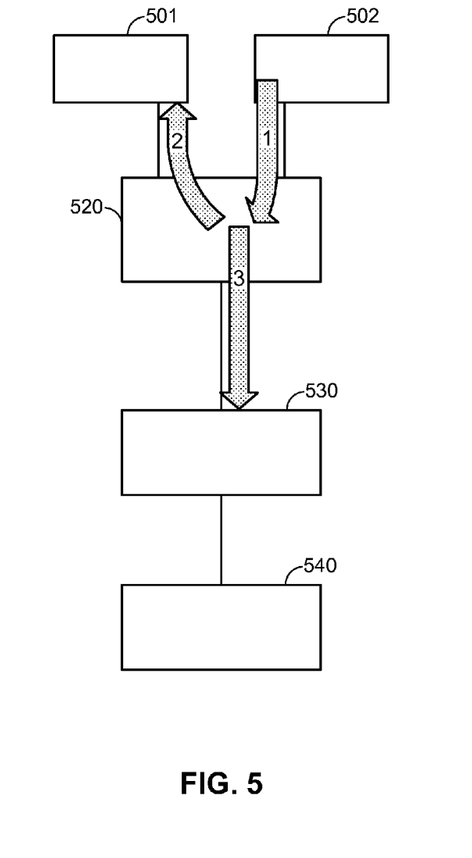
FIG. 5 illustrates a data invalidation.

FIG. 5 shows a sequence where initiator 502 sends a write addressed to target 540 through coherency controller 520 and target-side security filter 530. Initiator 501 is fully coherent. Second, to make sure that any old data with the same address that initiator 501 may have is discarded before it sends the write to the target, the coherency controller 520 sends an invalidation request to initiator 501, causing it to discard its data. Third, the coherency controller 520 forwards the write to the target-side security filter 530. As a consequence, if the security check fails on the write, the latest, correct data that may have resided in initiator 501 is lost and will never be properly written to the backing store, which creates a data coherency failure and potential security issue.

Figure 6:
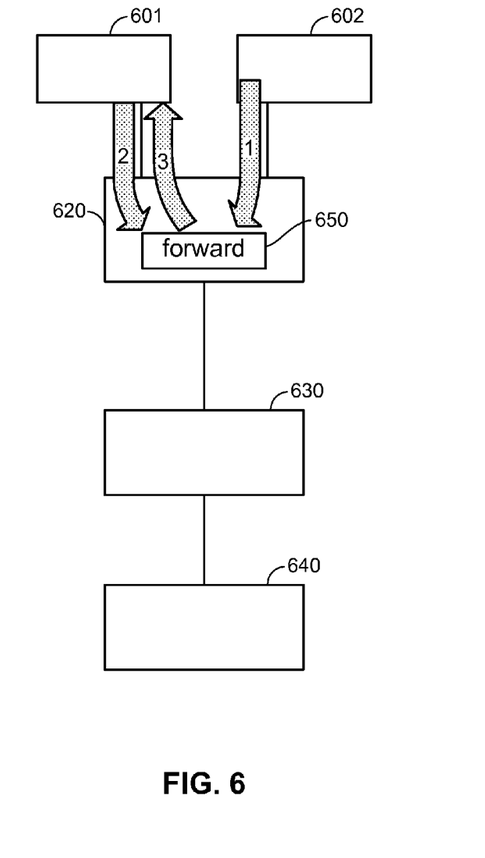
FIG. 6 illustrates write data forwarding.

FIG. 6 shows a sequence where initiator 602 sends a write addressed to target 640 through coherency controller 620 and target-side security filter 630. Second, initiator 601 sends a read to an overlapping set of addresses. Third, the coherency controller 620 uses some or all of the data from the write and sends it as a read response to initiator 601. This is called "forwarding" and is performed by forwarding unit 650. If initiator 601 can own coherent lines (i.e. it is a fully coherent initiator) the coherency controller 620 may not have to send the write to the target. As a consequence, the target-side security filter 630 may not see the write, making it impossible to handle a potential security violation. In addition, the read is never sent to the target-side security filter 630, so initiator 601 may get access to data even if it should not according to the security rules. In some cases, the snoop response may only provide part of the data, so a partial request may be sent to the target 640. The target-side security filter 630 still cannot apply security to the part of the data that has been forwarded.

Figure 7:
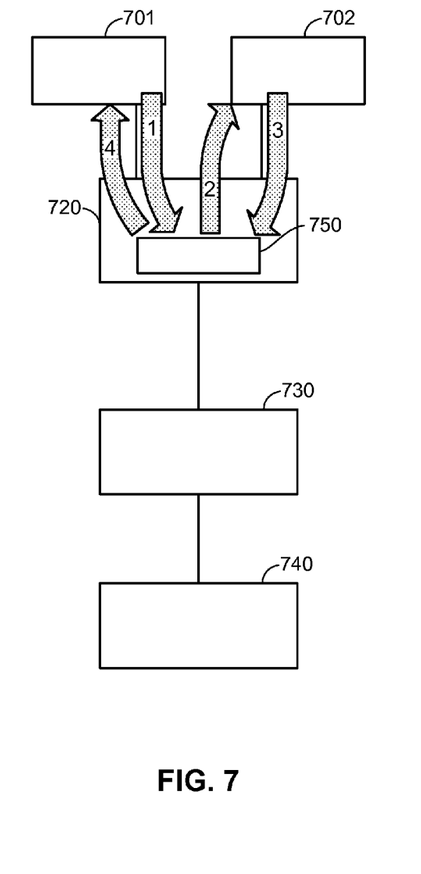
FIG. 7 illustrates snoop data forwarding.

FIG. 7 shows a sequence where initiator 701 sends a read addressed to target 740 through coherency controller 720 and target-side security filter 730. Initiator 702 is fully coherent. Second, the coherency controller 720 interrogates initiator 702 with a snoop to see if it has the data available. Third, if initiator 702 has the data, it responds to the snoop with a snoop response containing the data. Fourth, the coherency controller 720 then responds to the read from initiator 701 with the data obtained from initiator 702, using forwarding. This is called "snoop data forwarding" and is performed by data forwarding unit 750. As a consequence, the read is never sent to the target-side security filter 730, so initiator 701 may get access to data even if it should not according to the security rules. In some cases, the snoop response may only provide part of the data, so a partial request may be sent to the target 740. The target-side security filter 730 still cannot apply security to the part of the data that has been forwarded.

In at least the cases of discarding, merging, invalidation, write forwarding, and snoop data forwarding described above, conventional coherency controllers allow transactions in violation of target-side security rules. Therefore, what is needed is a system and method to allow target-side security checking in a cache coherent system.

SUMMARY

In accordance with the various aspects of this invention, the initiator or the coherency controller can choose to enable a coherent request (fully-coherent or I/O-coherent) for target-side security checking. When a request is marked as enabled for target-side security checking, the coherency controller makes sure that that request reaches the target and that no data is exchanged directly between the request and a coherent agent. Instead, it forces all exchanges to be done through the target, allowing the target-side security filter to apply the security rules correctly.

DETAILED DESCRIPTION

Figure 8:
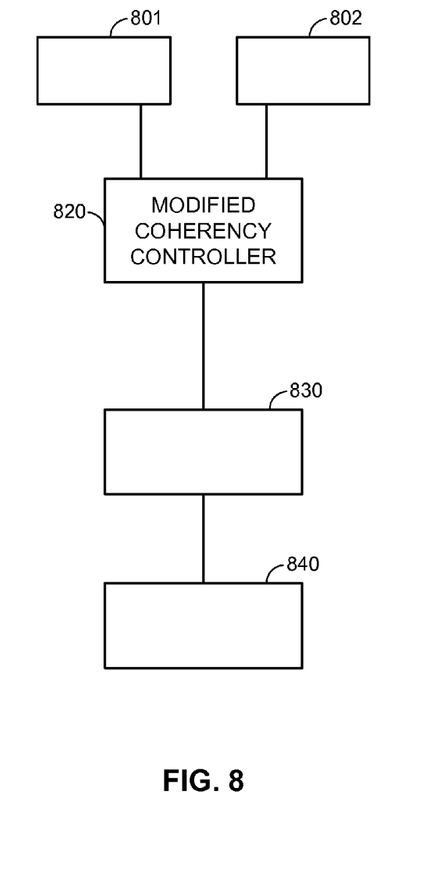
FIG. 8 illustrates a system with a modified coherency controller, in accordance with the teachings of the present invention.

FIG. 8 shows the equivalent of the system described in FIG. 2, but with a coherency system modified according to various aspects of the present invention. An initiator 801 and an initiator 802 are connected through a modified coherency controller 820 and a target-side security filter 830 to a target 840.

According to some aspects of this invention, the coherency is maintained through the coherency controller 820 that is centralized as shown in FIG. 8. According to other aspects of this invention, coherency is maintained using other schemes like distributed coherency. According to some aspects of this invention, the initiators 801 and 802 may be fully coherent and accept snoop requests. According to other aspects of this invention, any of the initiators 801 and 802 may be I/O (or one-way) coherent and not accept snoops. According to yet other aspects of this inventions, some initiators may be fully coherent and some other I/O coherent.

According to the various aspects of this invention, when a coherent request is marked as enabled for target-side security checking, the coherency controller makes sure that the request is passed to the security filter. It applies conditions to the processing of coherent accesses. In particular, it does not allow the request to be discarded, merged or responded to locally.

According to some aspect of the invention, the target-side security filter 830 can identify requests from various initiators (including requests created because of a snoop response) and apply security rules separately for each initiator, allowing security rules to use the identity of the requesting initiator as a parameter.

According to some aspect of the invention, the identity of an initiator is derived from the port of the coherency controller the request is coming from. According to other aspects of the invention, the identity is derived from information inside the request. According to other aspects of the invention, the identity is based on a combination of the port the request is coming from and information inside the request.

According to other aspects of the invention, the target-side security filter 830 can be guaranteed that attributes of one request have not been merged with attributes from another request.

According to some aspects of this invention, in response to a request marked as enabled for target-side security checking, the coherency system may selectively enable or disable some behaviors such as forwarding, merging or discarding.

According to some aspects of this invention, the marking of a request as enabled for target-side security checking may correspond to a per-request indication. According to other aspects of this invention, the marking is per-initiator or group of initiators. According to yet other aspects, it is global to the coherency system.

According to some aspects, the control of the behavior of the coherency system for target-side security is done using special logic that can take into account a number of parameters of the coherency system or of the request or of a combination thereof.

Figure 9:
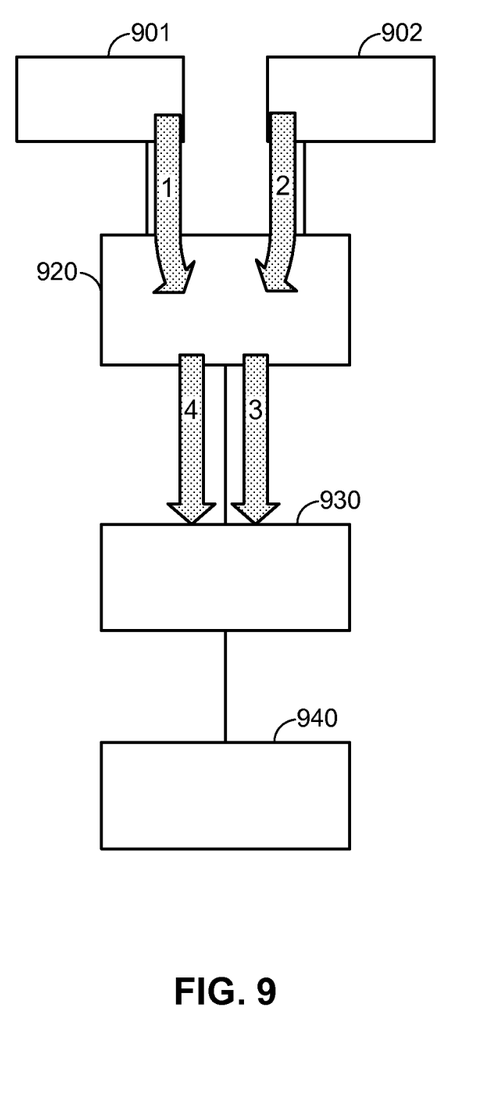
FIG. 9 illustrates two requests being sent to a target.

FIG. 9 shows a sequence where first, an initiator 901 issues a first request directed to a target 940 through a modified coherency controller 920 and a target-side security filter 930. Second, an initiator 902 issues a request that includes at least one overlapping address, the request being marked for target-side security checking. Third, the coherency controller 920 directs the request marked for target-side security checking to the target-side security filter 930. Fourth, the coherency controller 920 issues the first request to the target-side security filter 930.

This illustrates the behavior of the modified coherency controller 820 and 920 in response to transaction requests that in a prior art coherency controller would cause discarding (as shown in FIG. 3), merging (as shown in FIG. 4), invalidation (as shown in FIG. 5), write data forwarding (as shown in FIG. 6), or snoop data forwarding (as shown in FIG. 7).

In all such cases, the modified coherency controller causes two separate requests to be sent to the target-side security filter in order to allow it to perform appropriate filtering.

In the case of discarding (as shown in FIG. 3), merging (as shown in FIG. 4), or invalidation (as shown in FIG. 5) since the writes are to overlapping addresses, in accordance with various aspects of the present invention, the modified coherency controller ensures that the first write is complete before sending the second write. In the case of forwarding (as shown in FIG. 6) or snooping (as shown in FIG. 7) since the write and read are to overlapping addresses, in accordance with various aspects of the present invention, the modified coherency controller ensures that the write is complete before sending the read.

Rules

In a system according to the various aspects of this invention, when a request is marked as enabled for target-side security checking, the coherency controller observes the following four rules with respect to the request:
(1) Even though younger data is received or may be received in the future (if it is a request for write permission), the coherency controller always sends older write requests to the target anyway;
(2) The coherency controller does not forward the write request data to another agent. Instead, it sends the write request to the target, then reads the data from the target if necessary;
(3) The coherency controller does not request a coherent agent to abandon data. Instead, if older data is present, the coherency controller forces that data to be written back, then allows the request to proceed; and
(4) The coherency controller does not merge data. Instead, the coherency controller sends the request separately from potential merge candidate requests.

According to another aspect of this invention, the coherency controller is allowed to break one or more of these rules for requests marked as enabled for target-side security checking, requests not marked as enabled for target-side security checking, or both. If they happen, the resulting requests that are sent to the target are marked specially as "combined" so that if the combination fails security, the security system can handle the error. In some of these cases the error would be fatal as security may have been breached.

Process

Figure 10:
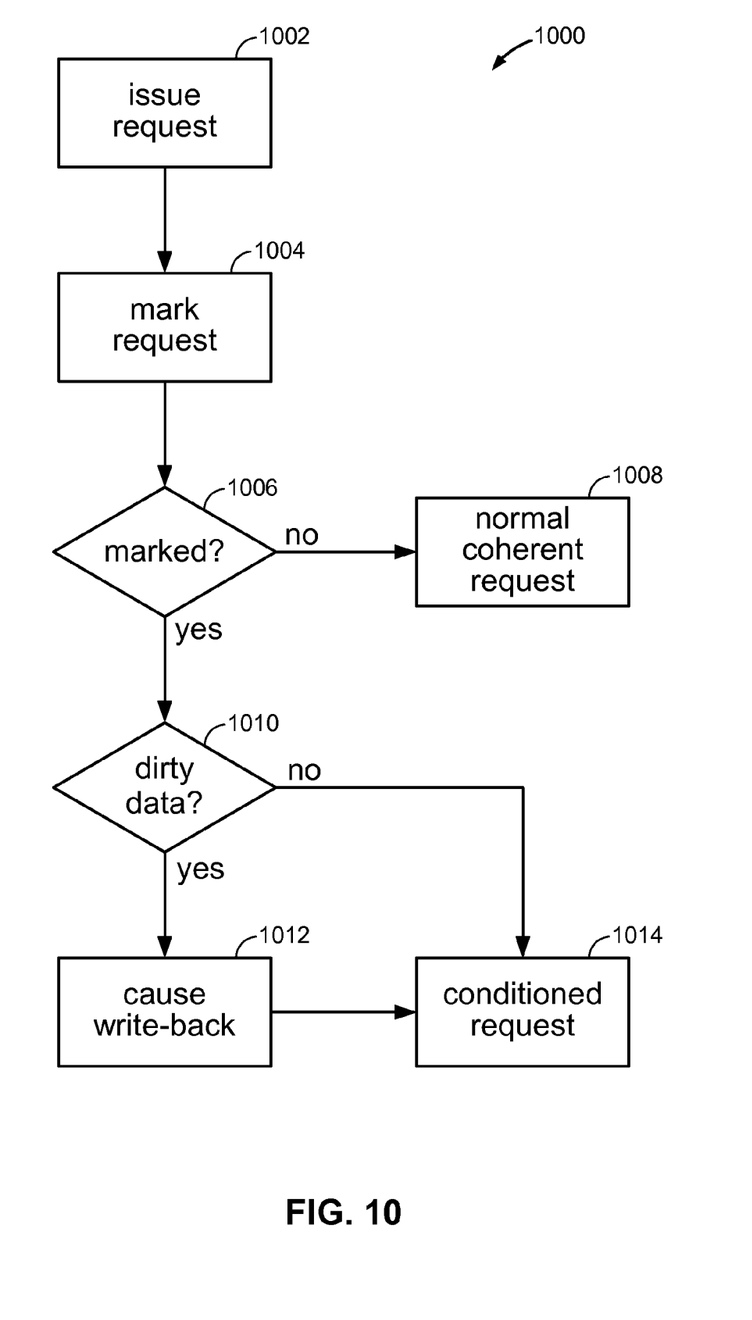
FIG. 10 illustrates the process of a coherency controller handling accesses marked for target-side security checking.

FIG. 10 illustrates the process 1000 by which the coherency controller dispatches requests from initiators to targets. A request is issued by an initiator at step 1002 and the initiator marks the request at step 1004 as either enabled for target-side security checking or not enabled for target-side security checking. The marking of the request is checked at step 1006 and if not marked for target-side security checking a normal coherent request is issued at step 1008. If the request is marked for target-side security checking, coherent caches are checked at step 1010 for dirty lines containing overlapping data. If dirty lines are present, the cache controller causes the caches containing those lines to perform a write-back at step 1012. After the write-back and if no write-back is necessary then the request is forwarded at step 1014 to the target-side security filter for checking.

The various aspects of the present invention may be implemented in software, hardware, application logic, or a combination of software, hardware, and application logic. The software, application logic and/or hardware may reside on a server, an electronic device, or a service. If desired, part of the software, application logic and/or hardware may reside on an electronic device, part of the software, application logic and/or hardware may reside on a server.

While the present invention has been described with reference to the specific applications thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

The foregoing disclosures and statements are illustrative only of the present invention, and are not intended to limit or define the scope of the present invention. The above description is intended to be illustrative, and not restrictive. Although the examples given include many specificities, they are intended as illustrative of only certain possible applications of the present invention. The examples given should only be interpreted as illustrations of some of the applications of the present invention, and the full scope of the present invention should be determined by the appended claims and their legal equivalents. Those skilled in the art will appreciate that various adaptations and modifications of the just-described applications can be configured without departing from the scope and spirit of the present invention. Therefore, it is to be understood that the present invention may be practiced other than as specifically described herein. The scope of the present invention as disclosed and claimed should, therefore, be determined with reference to the knowledge of one skilled in the art and in light of the disclosures presented above.

Although various aspects of the present invention are set out in the independent claims, other aspects of the invention comprise any combination of the features from the described embodiments and/or the dependent claims with the features of the independent claims, and not the solely the combination explicitly set out in the claims.

Unless defined otherwise, all technical and scientific terms used herein have the same meaning as commonly understood by one of ordinary skill in the art to which this invention belongs. Any methods and materials similar or equivalent to those described herein can also be used in the practice or testing of the present invention.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

What is claimed is:

1. A coherency controller for processing at least one request, the controller comprising:
   a first primary interface enabled to be connected to an initiator;
   a second primary interface enabled to be connected to a second initiator;
   at least one secondary interface enabled to connect to targets;
   a logic unit to enforce at least one of condition on the request; and
   a flag logic unit to determine if the request is enabled for target-side security checking,
   wherein the logic unit enforces the at least one condition when the flag logic unit indicates that the request is enabled for target-side security checking.

2. The coherency controller of claim 1 wherein the first primary interface is enabled to send snoop requests.

3. The coherency controller of claim 1 wherein the second primary interface is enabled to send snoop requests.

4. The coherency controller of claim 1 wherein the at least one condition is to disallow the discarding of data of a second request to an overlapping address range while the request that is enabled for target-side security checking is pending.

5. The coherency controller of claim 1 wherein the at least one condition is to disallow the merging of data between a second request to an overlapping address range and the request that is enabled for target-side security checking.

6. The coherency controller of claim 1 wherein the at least one condition is to disallow the invalidation of data to an overlapping address range in a coherent cache while the request that is enabled for target-side security checking is pending.

7. The coherency controller of claim 6 further comprising a snoop logic module to request that a coherent cache write back modified data within the range of the request.

8. The coherency controller of claim 1 wherein the at least one condition is to disallow the forwarding of write data from the request that is enabled for target-side security checking to a primary interface selected from the group including the first primary interface and the second primary interface.

9. The coherency controller of claim 1 wherein the at least one condition is to disallow the forwarding of write data to the request that is enabled for target-side security checking from an existing pending write of overlapping address range.

10. The coherency controller of claim 1 wherein the at least one condition is to disallow forwarding snoop response data to the request that is enabled for target-side security checking.

11. The coherency controller of claim 1 wherein the flag logic unit makes the determination based on the primary interface.

12. The coherency controller of claim 1 wherein the flag logic unit makes the determination based on properties of the request.

13. The coherence controller of claim 1 wherein the flag logic unit makes the determination based on configuration registers.

14. The coherence controller of claim 1 wherein the flag logic unit makes the determination based on signals driven by an external source.

15. The coherency controller of claim 1 further comprising:
   a request property unit to mark requests as combined; and
   override logic unit to override the enforcement of a number of conditions.
   wherein when override logic overrides the enforcement and one of the overridden condition happens, the request is marked as combined.

16. A system that is coherent, the system comprising:
   at least one coherent initiator;
   at least one initiator;
   a plurality of targets;
   a coherency controller in communication with the coherent initiator and the initiator; and
   a target-side security filter functionally between the coherency controller and at least one target selected from the plurality of targets,
   wherein the coherency controller is adapted to enforce a plurality of conditions on the handling of a request when the request is determined to be enabled for target-side security checking.

17. The system of claim 16 wherein the coherency controller is centralized.

18. The system of claim 16 wherein the coherency controller is distributed.

19. The system of claim 16 wherein at least two initiators are fully coherent.

20. The system of claim 16 wherein at least one initiator is I/O coherent.

21. A method of ensuring data security in a system with coherency, the method comprising the steps of:
   issuing a request from an initiator to a coherency controller;
   marking the request with a security checking option selected from the group including:
      enabled for target-side security checking; and
      not enabled for target-side security checking;
   checking to determine if the request is marked as enabled for target-side security checking,
   if the request is marked as enabled for target-side security checking, forwarding the request to a target-side security filter; and
   if the request is marked as enabled for target-side security checking, enforcing at least one condition.

22. The method of claim 21 wherein the at least one condition is to disallow the discarding of data of a second request overlapping the range of the request marked as enabled for target-side security checking.

23. The method of claim 21 wherein the at least one condition is to disallow the merging of a second request with the request that is marked as enabled for target-side security checking.

24. The method of claim 21 wherein the at least one condition is to disallow the invalidation of lines in a coherent cache.

25. The method of claim 24 further comprising the step of causing the coherent cache to write back modified data within the range of the request marked as enabled for target-side security checking.

26. The method of claim 21 wherein the at least one condition is to disallow the forwarding of write data from the request marked as enabled for target-side security checking to a cache.

27. The method of claim 21 wherein the at least one condition is to disallow forwarding of snoop response data in response to the request marked as enabled for target-side security checking.

28. The method of claim 21 wherein the marking is constant for the initiator.

29. The method of claim 21 wherein the marking is unique to the request.

* * * * *